United States Patent [19]

Pfanzer

[11] Patent Number: 4,512,078
[45] Date of Patent: Apr. 23, 1985

[54] JIG SAW WITH ORBITAL MECHANISM

[75] Inventor: Gerhard Pfanzer, Camberg, Fed. Rep. of Germany

[73] Assignee: Black & Decker Inc., Newark, Del.

[21] Appl. No.: 486,529

[22] Filed: Apr. 19, 1983

[30] Foreign Application Priority Data

Apr. 20, 1982 [DE] Fed. Rep. of Germany ... 8211249[U]

[51] Int. Cl.³ ............................................. B27B 11/02
[52] U.S. Cl. ............................................ 30/393; 74/50
[58] Field of Search ......................... 30/393, 394, 392; 74/50

[56] References Cited

U.S. PATENT DOCUMENTS

| 2,775,272 | 12/1956 | Papworth | 30/393 |
| 3,269,197 | 8/1966 | Enders | 74/50 |
| 3,890,708 | 6/1975 | Bauer | 30/393 |
| 4,137,632 | 2/1979 | Pfanzer | 30/393 |
| 4,262,421 | 4/1981 | Bergler | 30/393 |

FOREIGN PATENT DOCUMENTS 1093032 11/1967 United Kingdom .

Primary Examiner—Jimmy C. Peters

Attorney, Agent, or Firm—Ronald B. Sherer; Edward D. Murphy; Harold Weinstein

[57] ABSTRACT

A jig saw has a pivotally mounted reciprocating saw blade assembly which is reciprocated by a drive shaft. A pendular stroke device generates an additional feed movement of the saw blade. The pendular stroke device comprises a rod like element reciprocating in a direction substantially parallel to the direction of reciprocation of the saw blade, a rotatable drive element driven by the drive shaft, and a pivotally mounted engagement element against which the saw blade assembly is spring biased. The rod like element is coupled to the rotatable drive element and acts to pivot the engagement element to pivot the saw blade assembly. The pivotal axis of the engagement element is displaceable to change the spacing between the engagement element and the rod like element to determine the degree of or eliminate pivoting of the saw blade assembly. Preferably, the engagement element is pivotally mounted on an eccentric formed on a shaft which has a handle for adjustably rotating the shaft. In this way, when the pivotal feed movement is eliminated, the saw blade is not caused to slope in an oblique position.

18 Claims, 2 Drawing Figures

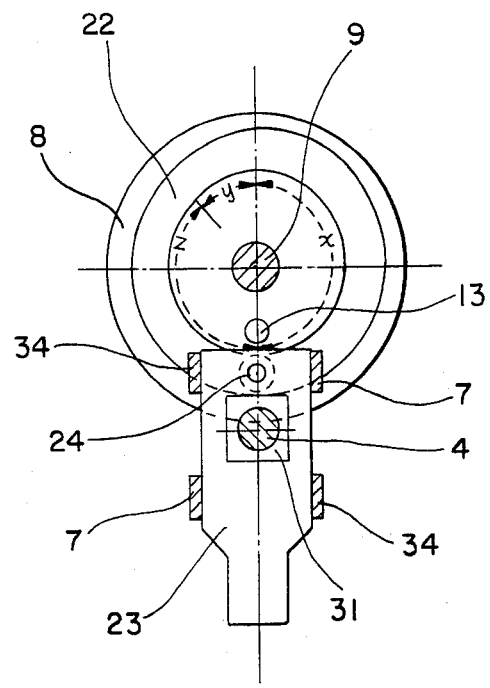

JIG SAW WITH ORBITAL MECHANISM

FIELD OF THE INVENTION

This invention relates to orbital mechanism jig saws, particularly portable electric jig saws, and is particularly concerned with the orbital mechanism and the adjustment thereof.

BACKGROUND OF THE INVENTION

Jig saws can incorporate a pendular stroke device for generating an additional feed movement of the saw blade. This combined with the reciprocating movement of the saw blade causes the saw blade to move around an orbital path. At times it is desirable to eliminate the component of pendular movement of the saw blade so that the saw blade only performs a reciprocating movement.

United Kingdom Patent Specification No. 1,093,032 proposes a mechanism for both eliminating and adjusting the amplitude of such pendular movement. To generate this pendular stroke movement, a leg of an oscillated U-shaped pendular element is caused to engage with one end of a pivotally mounted bell crank lever that carries at its other end a support roller that engages the saw blade. As a result of the oscillating movement of the pendular element, the bell crank and the support roller are pivoted around a bearing shaft of the bell crank so that the support roller superimposes the additional feed movement upon the reciprocating saw blade.

In order to eliminate the effect of the pendular stroke in U.K. Pat. No. 1,093,032, the leg of the bell crank lever acted upon by the pendular element is pivoted by engagement with a rotatable stop out of engagement with the pendular element. The result is that, due to this pivotal position of the bell crank lever, the support roller is forced against the saw blade and moves the latter into an oblique position with respect to the shoe of the jig saw. Such an oblique position is disadvantageous, particularly if the jig saw is to make a circular cut in a workpiece, because no accurate guidance along the desired path of cut is then possible.

It has been proposed in U.S. Pat. No. 4,137,632 to generate the feed movement of the saw blade of a jig saw by means of a rotating cam disc whose center axis extends substantially in the direction of the feed movement of the saw blade and which has an annular engagement surface that is situated at least in part in a plane oriented obliquely to the center axis. By means of this engaging surface provided on the cam disc, the lower bearing of the saw blade holder is displaced to such an extent upon rotation of the cam disc that the desired feed movement of the saw blade is generated. Although this jig saw is admittedly of simple design, nevertheless it does not readily permit the use of a support roller or the like for generating the pendular stroke movement and supporting and guiding the saw blade.

SUMMARY OF THE INVENTION

It is an object of the present invention to provide a jig saw in which the saw blade is moved during disconnected pendular stroke movement along a straight line oriented perpendicular to the support plane of the conventional saw shoe provided under the jig saw, in other words, not along an oblique straight line.

It is a further object of the present invention to provide a simplified pendular stroke device for an orbital jig saw.

According to the present invention there is provided a jig saw having a reciprocating saw blade assembly pivotally supported by the housing of the jig saw. An engagement element is pivotally supported in the housing for engaging the saw blade assembly to generate pivotal movement thereof. Drive means is provided for simultaneously reciprocating the saw blade assembly and driving an actuating member for pivoting the engagement element. Adjusting means, preferably an eccentric, is provided for displacing the pivotal axis of the engagement element to determine the pivotal movement of the saw blade assembly. By operation of the adjusting means the pendular stroke of the saw blade assembly can be adjusted or eliminated.

The pivotal displacement member is preferably a bell crank lever, in which case the spacing between the actuating member, such as an elongate pendular element, acting upon the bell crank lever to generate a pendular stroke movement and the leg of the bell crank lever so acted upon, can be modified by shifting of the bell crank lever. Through such a change of this spacing as a result of physical displacement of the bell crank lever, the degree of the effect of the pendular element on the bell crank lever can be adjusted, and thus the magnitude of its pivoting movement, without such a physical displacement requiring any pivoting of the bell crank lever. In other words, the saw blade is not moved into an oblique position upon disconnection of the pendular stroke.

Advantageously a simple adjustability is obtained if the bell crank lever is pivotally mounted on a rotatable shaft having an eccentric surface and is mounted on this eccentric surface. Then, in one rotational position of the shaft, the bell crank lever is displaced by the eccentric surface substantially parallel to the longitudinal axis of the saw blade so that a pendular stroke generating engagement of the pendular element and the bell crank lever is prevented. While in another rotational position of this shaft, the bell crank lever is lifted by the eccentric surface in the direction toward the pendular element so that there is brought about an engagement of the pendular element and bell crank lever causing a maximum pendular stroke.

To achieve a particularly simple structure of the pendular stroke device, the drive means can comprise a rotatable drive element having a closed cam that is eccentric with respect to its axis of rotation, and the zone of contact of the pendular element and the cam can be situated in a plane comprising the axis of rotation.

Compared to the jig saw proposed in U.K. Pat. No. 1,093,032 that uses a substantially U-shaped pendular element, as discussed above, according to an aspect of the present invention the jig saw pendular element end that is coupled with the drive element moves only during that part of the cam path that corresponds to the deviation of the closed cam from a concentric circular path around the axis of rotation of the drive element. Thereby the requirements made on the bearings and the mechanical effort are reduced substantially.

This closed cam can be circular along about 180° with the central point of the circular arc coinciding with the axis of rotation, while the balance of the curve can be shaped in such a way that the desired feed movement is generated upon the ascent of the saw blade. The closed cam may be formed by a groove. Preferably the groove is formed in one face of a gear wheel driven by the armature shaft of an electric motor, an eccentric pin projecting from the other gear wheel face for reciprocating the blade holder.

The pendular element can be of rod-shaped configuration and be engaged at one of its ends with the cam while its other end is engaged with one leg of the pivotally mounted bell crank lever forming a portion of the engagement element.

Although, preferably a roller of the bell crank lever engages the back of the saw blade, the roller could engage and run on the back of the saw blade holder.

Other objects, features and advantages of the present invention will become more fully apparent from the following detailed description of the preferred embodiment, the appended claims and the accompanying drawings.

BRIEF DESCRIPTION OF THE DRAWINGS

In the accompanying drawings:

FIG. 2 illustrates a partial section on the line II—II of FIG. 1, showing only the parts that are essential for an understanding of the invention.

DETAILED DESCRIPTION OF THE PREFERRED EMBODIMENT

Figure 1:
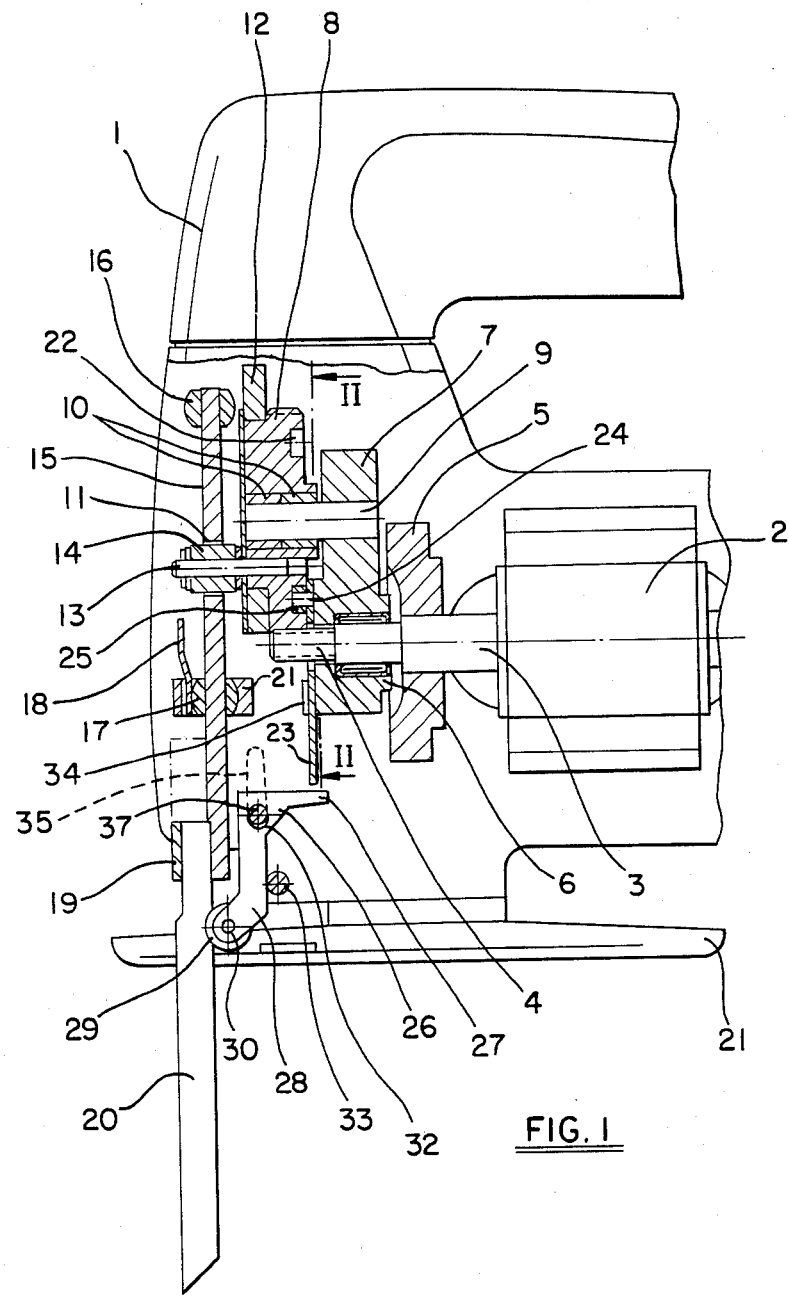
FIG. 1 illustrates in a simplified representation the front portion of a jig saw according to to the invention, the housing being partly broken away.

The preferred embodiment of a jig saw according to the invention is illustrated by way of example in FIGS. 1 and 2.

The jig saw has a housing 1 consisting of a plurality of parts made in general of plastic, to which a conventional shoe 21 is mounted at the bottom, which is only schematically illustrated and, as is well known, has a slot for the passage therethrough of the saw blade 20. In the housing 1 is mounted an electric motor 2 having a cooling fan 5 secured on its armature shaft 3. A pinion 4 is formed on the end of the armature shaft 3.

Adjacent the pinion 4, the armature shaft 3 is rotatably mounted in a needle bearing 6 supported in a metal bearing support member 7 secured to and supported by the housing in known manner. In the bearing support 7 there is also mounted a stub shaft 9 on which is rotatably mounted a gear wheel 8 by means of two sleeve bearings 10. The gear wheel 8 meshes with and is drivingly rotated by the pinion 4. The gear wheel 8 carries an eccentric pin 13 which is provided on its free end with a freely rotatable roller 14. Upon rotation of the gear wheel 8, the roller 14 is guided in a conventional cross-slot 11 of the saw blade holder 15 which is thus reciprocated vertically in bearings 16 and 17 pivotally secured in the housing 1. On the gear wheel 8 there is also mounted an eccentrically arranged balancing weight 12.

At the lower end of the saw blade holder 15 there is a schematically illustrated clamping device 19 in which the saw blade 20 is mounted. In the plane of FIG. 1, the saw blade holder 15 is restrictedly pivotal towards the left about the pivotal axis of the bearing 16 against the resilient force of a leaf spring 18 tensioned between the housing 1 and bearing 17. The pivotal bearing 17 is pivotally and slidably mounted in a bracket 21 with the spring 18 urging the bearing 17 to the right hand end of the bracket 21 in FIG. 1, in which position the blade 20 is upright, that is perpendicular to the support plane of the shoe 21. The blade can, therefore, experience orbital motion with a feed component in the forward direction of cut.

At the side facing the bearing support 7, the gear wheel 8 has formed therein a somewhat circular cam groove 22 that changes over two consecutive circumferential portions x, y its radial spacing from the axis of rotation of the gear wheel 8. In other words, these portions x, y of the groove 22 are neither truly circular nor concentric with the center axis of the shaft 9, whereas the remainder z of the groove 22 is both circular and concentric with the axis of rotation of the gear wheel 8. Into the groove 22 extends a pin 24 carrying a needle bearing 25 engaging with the lateral walls of the groove 22. The pin 24 is secured in a rod element 23. The rod element 23 is held by and vertically reciprocates in guides 34, see particularly FIG. 2, formed on the bearing support 7. The guides 34 engage over and around the vertical edges of the rod element 23 so that it can be vertically reciprocated and cannot tilt in the direction of the longitudinal axis of the armature shaft 3. A recess 31 is provided in the rod element 23 and through which the pinion 4 projects so that the pinion 4 does not impede the vertical reciprocating movement of the rod element 23.

Beneath the rod element 23, a bell crank lever 26 is pivotally mounted on a shaft 37 mounted in the housing 1. One end of the shaft 37 projects out of the side of the housing 1 and has mounted thereon a handle or knob 35 (shown in broken lines in FIG. 1) for rotation thereof. The bell crank lever 26 is situated with one leg 27 in the region of the lower end of the rod element 23. The other leg 28 is formed as a substantially U-shape sheet-metal channel section so that there are two parallel-oriented walls between which there is supported, on a short shaft 30, a support roller 29 rotatably engaging the rear edge of the saw blade 20. A stop 33, by engaging the leg 28 of the bell crank lever 26, limits the pivotal movement of the bell crank 26, and so also of the support roller 29, away from the saw blade 20.

The bell crank shaft 37 has an eccentric circumferential segment 32 (not cross-hatched in FIG.-1) formed thereon at the location where the shaft 37 passes through the bell crank lever 26, so that the bell crank lever 26 is pivotally mounted on the eccentric segment 32.

When the jig saw is operated as illustrated, the saw blade 20 is reciprocated vertically in a vertical position by the rotational movement of the gear wheel 8 via the eccentric pin 13. During this rotation of the gear wheel 8, the rod element 23 moves vertically in accordance with the configuration of the groove 22. In other words, if the gear wheel 8 rotates clockwise in FIG. 2, then, starting from the position illustrated in FIG. 1, the saw blade 20 is moved upwardly while the rod element 23, as a result of the radius of the groove 22 becoming larger through 180°, moves downwardly away from the axis of rotation of the shaft 9. Since however, in the position illustrated, as a result of the downward orientation of the eccentric segment 32 of the shaft 37, a maximum spacing exists between the lower end of the rod element 23 and the leg 27, there does not occur any contact between the rod element 23 and leg 27, and therefore no pivoting of the bell crank lever 26 occurs. In this position of the eccentric segment 32, the saw blade 20 moves in the vertical only without any forward feed movement. In other words, the saw blade is reciprocated vertically without any orbital movement occurring. In this case, the saw blade is guided perpendicularly to the contact or support surface of the shoe 21; this cannot be achieved with previously known jig saws having a supporting roller and pendular stroke when the pendular stroke is disconnected.

During continued clockwise rotation of the gear wheel 8 beyond the "eccentric" region x, in other words, the region with the enlarging radial spacing out from the center axis of the shaft 9, the bearing 25 passes through a transitional region through which the rod element 23 is again returned into its upper position. This transitional region y covers an arc of, for instance, 25 to 35 degrees. Then the groove 22 proceeds along a circular path z whose center point is the center axis of the shaft 9 so that the rod element 23 will then remain in its upper position until the start of the "eccentric" region x has again reached the bearing 25, i.e., the position illustrated in FIG. 2 is attained again.

To convert the above-described movement of the rod element 23 into a pendular stroke movement of the saw blade 20, the shaft 37 is rotated by means of the handle or knob 35 so that the bell crank lever 26, due to the rotation of the eccentric segment 32, is lifted and brought closer to the lower end of the rod element 23. It should be noted that rotation of the eccentric segment 32 from the underside of the shaft 37 to the upperside, lifts the bell crank 26 physically with the leg 28 still in contact with the stop 33 and the saw blade 20 still remaining in a truly vertical position. Once the maximum approach position that is possible in this manner of the bell crank 26 to the rod element 23 has been reached, the lower end of the rod element 23 depresses, during the above-described downward movement caused by the configuration of the groove 22, the leg 27 and pivots the bell crank lever 26 about the shaft 37. As a result, the support roller 29 is moved forwards and pivots the saw blade 20 together with the saw blade holder 15 about the bearing 16 so that upon upward movement of the saw blade 20 out of the position according to FIG. 1, the desired feed movement is imparted to the saw blade. As a function of the configuration of the groove 22, there occurs just after the end, or actually at the end, of the upward movement of the saw blade 20, the upward movement of the rod element 23. Thereby, through the engagement of the saw blade 20 with the workpiece, and/or through the force of the spring 18, the saw/blade is returned into its vertical position. Once the saw blade 20 has attained this position, its further downward movement is continued without pivoting, because the rod element 23, due to the afore-described shape of the groove 22, remains in its upper position; in other words, the bell crank lever 26 is likewise not pivoted and the support roller 29 is not displaced to achieve a forward feed movement of the saw blade 20 during the balance of the downward movement of the saw blade 20.

As a result of corresponding intermediate positions in which the eccentric segment 32 of the shaft 37 can be set by the handle 35, the extent of the pendular stroke movement of the saw blade 20 can be continuously adjusted between the maximum pendular stroke movement and the complete absence of a pendular stroke movement.

It will be appreciated that the contour of the groove 22 around the center axis of the shaft 9 can be selected in such a way that any desired pendular stroke movement of the saw blade can be attained. This configuration of the groove 22 follows the same principles as those described in the above-mentioned U.S. Pat. No. 4,137,632 the disclosure of which is hereby incorporated herein by reference.

The above described embodiment, of course, is not to be construed as limiting the breadth of the present invention. Modifications, and other alternative constructions, will be apparent which are within the spirit and scope of the invention as defined in the appended claims.

What is claimed is:

1. A jig saw, comprising:
 a housing;
 a reciprocating saw blade assembly pivotally supported by said housing;
 an engagement element pivotally supported by said housing for engaging said saw blade assembly to generate pivotal movement thereof;
 actuating means for pivoting said engagement element;
 drive means for simultaneously reciprocating said saw blade assembly and driving said actuating means;
 adjusting means for displacing the pivotal axis of said engagement element to determine the pivotal movement of said saw blade assembly; and
 said engagement element comprising a bell crank one arm of which is acted upon by said actuating means and the other arm of which carries a roller which engages said saw blade assembly.

2. The jig saw of claim 1, wherein said adjusting means comprises an eccentric.

3. The jig saw of claim 2, wherein said eccentric is formed on a shaft rotatably supported by said housing.

4. The jig saw of claim 3, wherein said engagement element is pivotally mounted on said eccentric.

5. The jig saw of claim 4, wherein a handle is connected to said shaft for adjustable manual rotation thereof.

6. The jig saw of claim 1, wherein said actuating means comprises a rod element reciprocally driven lengthwise in a direction at right angles to the pivotal axis of said bell crank.

7. A jig saw, comprising:
 a pivotally mounted reciprocating saw blade holder by which a saw blade is held to form a saw blade assembly;
 a drive shaft for reciprocating said saw blade holder;
 a pendular stroke device for generating an additional feed movement of said saw blade;
 said pendular stroke device comprising a pendular element reciprocating in a direction substantially parallel to the direction of the reciprocating movement of the saw blade, a rotatable drive element driven by said drive shaft, and a pivotally mounted engagement element against which said saw blade assembly is spring biased, said pendular element being coupled with said rotatable drive element and acting to pivot said engagement element to pivot said blade assembly;
 means for adjustably displacing the pivotal axis of said engagement element to change the spacing between said engagement element and said pendular element; and
 said pendular element is elongate and one end of which is driven into engagement with a leg of a pivotally mounted bell crank lever forming part of said engagement element, the other leg of said bell crank lever supporting a roller which engages the saw blade assembly.

8. The jig saw of claim 7, wherein said displacing means comprises an eccentric upon which said engagement element pivots.

9. The jig saw of claim 8, wherein said eccentric is formed on a shaft having means connected thereto for adjustable rotation thereof.

10. The jig saw of claim 7, wherein the bell crank lever is pivotally mounted on an eccentric surface on a rotatable shaft, whereby in one position of said rotatable shaft there is prevented a pendular-stroke-generating engagement of the pendular element and the bell crank lever, and in another position of said rotatable shaft there is brought about an engagement of the pendular element and bell crank lever to cause a maximum pendular stroke.

11. The jig saw of claim 7, wherein said rotatable drive element has a closed eccentric cam formed around its axis of rotation, said pendular element engaging and being driven by said closed cam.

12. The jig saw of claim 11, wherein said closed cam is circular over an arc of about 180° with the center point of the circular arc coinciding with the axis of rotation of said rotatable drive element.

13. The jig saw of claim 11, wherein said closed cam is formed by a groove.

14. A jig saw, comprising:
a housing;
a saw blade assembly reciprocally and pivotally mounted in said housing;
a rotatable member having an eccentric pin for reciprocating said saw blade assembly, and said rotatable member having a cam disposed around the axis of rotation of said rotatable member;
an actuating member engaging and being reciprocated by said cam;
an engagement element pivotally supported by said housing and acted upon by said actuating member to generate pivotal movement of said saw blade assembly;
adjusting means for displacing said engagement element to change the spacing between said engagement element and said actuating member;
said cam comprising a groove, and said actuating member comprising a rod element reciprocated in a direction perpendicular to the axis of rotation of said rotatable member;
said engagement element comprising a bell crank, and said adjusting means comprising an eccentric formed on an adjustably rotatable shaft, said bell crank being pivotally mounted on said eccentric;
a spring biasing said saw blade assembly against said bell crank; and
a stop supported by the housing for limiting movement of said bell crank under the action of said spring.

15. The jig saw of claim 14, comprising a shoe for supporting the jig saw on a work piece being cut, the shoe being connected to said housing and having an aperture through which the saw blade assembly reciprocates, and wherein said adjusting means is manually operable to displace said engagement element without pivoting said saw blade assembly, whereby said saw blade assembly can be reciprocated at right angles to said shoe when said adjusting means places said engagement element out of the reach of said actuating member to eliminate pivotal movement of said saw blade assembly.

16. A jig saw, comprising:
a pivotally mounted reciprocating saw blade assembly;
a rotatable drive shaft connected to said saw blade assembly for reciprocation thereof;
a reciprocating element having two ends and connected to said drive shaft for reciprocation thereby substantially parallel to said saw blade assembly;
an adjustably rotatable shaft provided with an eccentric;
a bell crank pivotally mounted on said eccentric, one arm of said bell crank being acted upon by one end of said reciprocating element, and another arm of said bell crank carrying a roller for acting upon said saw blade assembly to effect pivoting thereof;
a spring biasing said saw blade assembly pivotally into direct engagement with said roller;
a stop engageable by said bell crank to limit pivotal movement of said bell crank transmitted thereto by said saw blade assembly under the biasing action of said spring; and
means for manually rotating said adjustably rotatable shaft to displace said eccentric and change the location of said bell crank relative to said one end of said reciprocating element to change the distance through which said roller pivots said saw blade assembly.

17. The jig saw of claim 16, wherein said eccentric is disposed between said saw blade assembly and said reciprocating element.

18. The jig saw of claim 17, wherein said reciprocating element has mounted at the other end a roller which engages in a cam groove in a member mounted on said rotatable drive shaft, said cam groove being somewhat circular and encircling said rotatable drive shaft for rotation therewith, half the arcuate extent of said groove being concentric with said rotatable drive shaft and two other portions of the arcuate extent of said groove being eccentric therewith.

* * * * *